Sept. 3, 1968    D. C. HOWLAND    3,399,861
ELECTROMAGNETIC TORQUE MOTOR
Filed Oct. 22, 1965    2 Sheets-Sheet 1
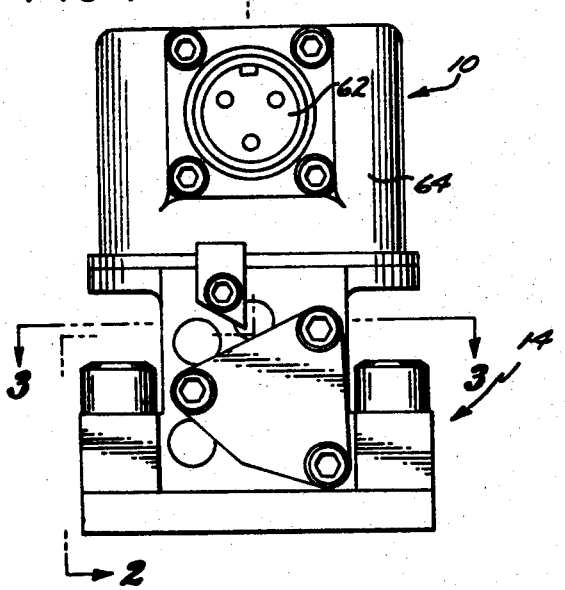
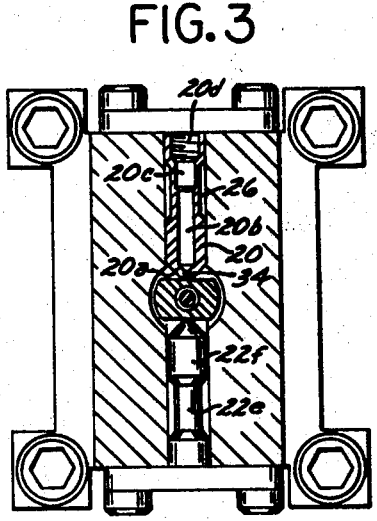
INVENTOR.
DONALD C. HOWLAND
BY Harvey C. Hieons.
ATTORNEY

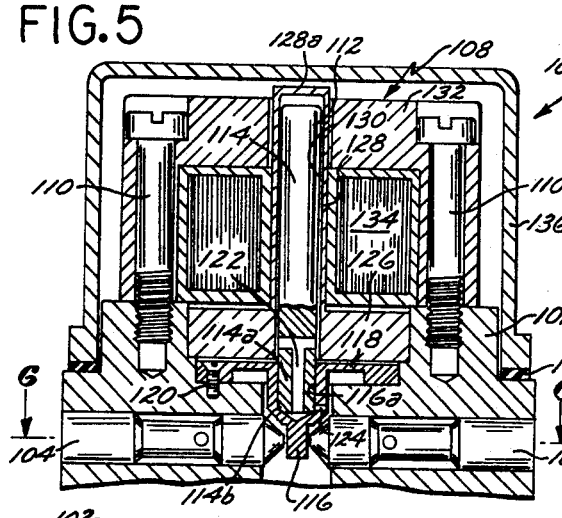

United States Patent Office 3,399,861
Patented Sept. 3, 1968

3,399,861
ELECTROMAGNETIC TORQUE MOTOR
Donald C. Howland, Costa Mesa, Calif., assignor to Cadillac Gage Company, Detroit, Mich., a corporation of Michigan
Filed Oct. 22, 1965, Ser. No. 501,351
8 Claims. (Cl. 251—129)

ABSTRACT OF THE DISCLOSURE

The present invention relates to an electromagnetic torque motor having a diaphragm-like pivotal support means encircling the armature, said support means being substantially the same radial cross-section throughout its 360° encirclement and separate passage means in the armature insuring equal pressure on both sides of the support means.

---

The present invention relates generally to electromagnetic torque motors, and more particularly to motors of this type which are substantially immune to certain malfunctions as a result of high acceleration or other momentary forces thereon.

Electromagnetic torque motors of various designs and construction have been in existence for many years. Such motors have been used for controlling different mechanical and electrical instrumentalities in many different environments.

Torque motors of the general description relating to the present invention have found use as means for controlling the position of pressure responsive devices of one kind or another. More specifically, such electromagnetic actuators, as they are broadly referred to, have found particular use as the control means of hydraulic servo systems wherein a piston or other pressure responsive element is positioned in accordance with one or more electrical signals.

Typically, such servo systems employ a piston which is rectilinearly movable within a cylinder therefor, the electromagnetic actuator being operable to control the application of fluid pressure to such piston to thereby control its position within the cylinder. The torque motor, in such application, usually controls the flow of fluid under pressure to one or the other sides of the piston through suitable fluid passageways.

Electromagnetic devices heretofore used in such servo systems have experienced malfunctions due to their particular construction. The fact that an electromagneticly movable element, such as an armature, is used to control the flow of fluid through suitable passageways, presents the problem of properly isolating the movable parts from the fluid being controlled. This problem is particularly acute in certain devices where the electromagnetic means itself is so closely associated with the armature that fluid which might reach or surround the armature also reaches the electromagnetic device thereby causing faulty operation. To be more specific, since armatures must, of necessity, be physically close to the electromagnetic means acting thereon, the structures heretofore employed have been incapable of permitting the fluid to circulate about the armature since, thereby, the electromagnetic means has been rendered nonworkable.

Prior constructions of electromagnetic torque motors have been such that relatively high acceleration forces acting on the unit have caused the same to operate in a faulty manner. That is, since the movement of the armature in prior devices caused a flow control element to be moved accordingly relative to the flow of fluid, any extraneous or outside force action thereon caused the armature to assume a position different from that called for by the electromagnetic actuator.

This latter disadvantage has been particularly acute in those applications wherein electromagnetic servo systems have been employed on rocket driven space craft. Such vehicles are subjected to high acceleration forces in attaining sufficient velocity to orbit the earth or to escape its gravity, as the case may be. As can be well appreciated, faulty operation of devices of this character in space crafts results in most extraordinary problems.

It is an object of the present invention to provide an electromagnetic torque motor which is substantially immuned to high acceleration and other momentary forces applied thereto.

Another object of the present invention is to provide an electromagnetic torque motor wherein the armature is mass balanced so as to be substantially uneffected by such momentary forces.

A further object of the present invention is to provide an electromagnetic torque motor as characterized above wherein the fluid to be controlled by the motor is permitted to freely circulate about the armature and other parts associated therewith.

Another object of the present invention is to provide an electromagnetic torque motor as characterized above wherein the viscosity of such fluid is employed to advantage in dampening abrupt forces applied to the armature, whether created by the electromagnetic means or externally thereof.

A still further object of the present invention is to provide an electromagnetic torque motor as characterized above wherein the electromagnetic actuator is physically isolated from the armature to be actuated thereby to prevent damage to the actuator by the fluid being controlled by the armature.

Another object of the present invention is to provide an electromagnetic torque motor as characterized above wherein the electromagnetic actuator can be potted with suitable potting compounds, or which can be housed within any other appropriate enclosure for providing a hermetically sealed environment therefor.

It is another object of the present invention to provide an electromagnetic torque motor as characterized above wherein the electromagnetic actuator is generally circular in cross section so as to provide a more compact and efficient device in spite of the fact that the armature is separated therefrom.

An even further object of the present invention is to provide an electromagnetic torque motor as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a side elevational view of an electromagnetic servo system according to the present invention;

FIGURE 2 is a fragmentary cross sectional view of the system of FIGURE 1, taken substantially along line 2—2 thereof;

FIGURE 3 is a horizontal sectional view through the system of FIGURE 1, taken substantially along line 3—3 thereof;

FIGURE 4 is a fragmentary sectional view taken substantially along line 4—4 of FIGURE 2;

FIGURE 5 is a fragmentary sectional view of a second embodiment of the present invention;

FIGURE 6 is a horizontal sectional view taken substantially along line 6—6 of FIGURE 5;

FIGURE 7 is a fragmentary sectional view through a third embodiment of the present invention;

FIGURE 8 is a top plan view of the third embodiment shown in FIGURE 7; and

FIGURE 9 is a diagrammatic showing of a servo system using a torque motor according to the present invention.

Like reference characters indicate corresponding parts throughout the several views of the drawings.

Referring to FIGURE 1 of the drawings, there is shown therein a first embodiment 10 of a servo system according to the present invention. As shown most clearly in FIGURE 2 of the drawings, such embodiment comprises an electromagnetic torque motor 12 and a hydraulic unit 14 to be actuated thereby.

Although the subject torque motor has many different and varied applications, it is shown as part of a servo system due to the fact that this application takes particular advantage of the present invention.

Embodiment 10 of the present invention comprises a first housing 16 formed with a fluid chamber 18 in communication with one or more conduits as shown at 20 and 22. As will be readily apparent to those persons skilled in the art, the subject torque motor may be double acting so as to control the flow of fluid in either of the two conduits 20 and 22. On the other hand, the subject invention is equally applicable for controlling the flow of fluid in only a single conduit if the particular application requires this.

Conduits 20 and 22 are substantially identical in construction and are part of a much larger hydraulic system, as will hereinafter become apparent. Suffice for the present, however, to realize that each such conduit is in communication with the fluid chamber 18 through an orifice formed in the end of the respective conduit. One such orifice is shown at 24 in the tapered end 20a of conduit 20. Such conduit is further provided with a through opening of which orifice 24 is a portion, such through opening comprising an intermediate portion 20b and an enlarged end portion 20c. The latter portion 20c is formed with suitable fastening threads 20d for receiving an appropriate fitting (not shown) which is part of the overall hydraulic system.

As best shown with respect to conduit 22 in FIGURE 2 of the drawings, the exterior of each of the conduits is formed with a reduced intermediate portion, as shown at 22e. Such intermediate portion provides an annular cavity 26 about the conduit, the enlarged opposite end portions 22f and 22g effectively sealing such annular opening within the first housing 16.

As shown with respect to conduit 20, a transverse through opening 20h is provided therein to afford communication between the intermediate portion 20b of the through opening and the annular cavity thereabout. Thus, it is seen the fluid flowing within the respective conduits 20 and 22 is free to leave such conduits by means of the transverse openings therein.

First housing 16 is formed with suitable passageways 16a and 16b which conduct the fluid pressure to various control instrumentalities as will hereinafter be described.

Positioned partially within first housing 16 is an armature 28. Such armature comprises a magnetic portion 28a and a flow control portion 28b, the latter of which is movably positioned within the fluid chamber 18 for cooperation alternatively with the conduits 20 and 22. Such armature may be formed as a unitary structure or, as shown in FIGURE 2 of the drawings, the magnetic portion 28a may be formed separately of the flow control portion 28b and attached thereto to provide the unitary structure.

The magnetic portion 28a is generally cylindrical in construction and extends beyond the first housing 16. A central through opening 28c is formed in portion 28a and a similar opening 28d is formed in the flow control portion 28b. The lower end of opening 28d is tapered as shown at 28e to facilitate the ingress of fluid pressure as will hereinafter be explained.

Magnetic portion 28a is further provided with an annular flange 28f adjacent a reduced end portion 28g, the latter of which fits within a suitable opening formed in the flow control portion 28b. The annular flange 28f is thereby caused to bear against the upper end of the flow control portion 28b.

Armature 28 is further provided with pivotal means 30 which may take substantially any desired form, but is shown in the drawings as comprising an annular diaphragm 32, the marginal edge 32a of which is made relatively heavy. Diaphragm 32 may be integrally formed with flow control portion 28b by being cast therewith, and is relatively thin to permit the entire armature 28 to pivot while the marginal edge 32a is secured to the first housing 16 by screws 34.

Positioned within armature 28 is a lever 36, the upper end portion 36a of which effectively seals the upper end of the opening 28c formed in magnetic portion 28a. The main portion 36b of lever 36 is tapered as shown in FIGURE 2 of the drawings.

An opening 28h is formed in the side wall of magnetic portion 28a for purposes which will hereinafter be explained in detail.

As thus described and as shown in FIGURE 2 of the drawings, the armature 28 is free to move in opposite directions so as to cause the flow control portion 28b to open and close the through openings in the conduits 20 and 22.

The electromagnetic actuator 12 is constructed such as to be placed on top of and to be firmly secured to the lower housing 16. Such actuator is characterized by having a second housing 40 formed in two parts, a housing member 42 and a magnetic core member 44.

Housing member 42 is formed with a centrally located armature chamber 46 as a result of a relatively long tubular member 48 having an upper end wall 48a. Such armature chamber comprises an elongated main portion 46a and an enlarged lower portion 46b. The latter, as shown in FIGURE 2 of the drawings, accommodates the relatively large annular flange 28f on the magnetic portion 28a.

The armature chamber 46a is of such size and shape as to accommodate the magnetic portion 28a such as to permit the same to pivot about the support means 30. Housing member 42 may be formed of any appropriate non-magnetic material which permits magnetic flux to pass therethrough so as to reach and act upon the armature 28 as will hereinafter become readily apparent.

The lower end of housing member 42 is formed to mate with and engage the upper end of housing 16, there being sealing means 50 interposed therebetween to provide the desired hermetic seal.

Positioned on housing member 42 is the core member 44 having a pair of opposed pole pieces 52 and 54. As shown most clearly in FIGURE 4 of the drawings, each such pole piece is provided with an arcuate pole face as shown respectively at 52a and 54a.

Immediately beneath the pole pieces 52 and 54, there is provided electromagnetic means 56 comprising a circular coil or winding connected to suitable lead wires 58 and 60 for conducting electrical current to the winding through a suitable connector 62 attached to a shroud or enclosure 64 by suitable fastening screws 66.

Fastening bolts 68 extend through suitable openings in core member 44 and housing 42, and threadedly engage the first housing 16 to firmly secure the electromagnetic actuator 12 to the hydraulic unit 14.

The enclosure 64 may take substantially any desired form and shape but is shown in FIGURE 4 as generally circular in cross section, the same general shape of the electromagnetic means therewithin.

Energization of the electromagnetic winding of electromagnetic means 56 causes magnetic flux to flow in circular paths in the magnetic core 44 and magnetic portion 28a of armature 28. Depending upon the direction of flow of such magnetic flux, the magnetic portion 28a is polarized accordingly so as to be attracted to one or the other of the pole pieces 52 and 54.

Normally, fluid under pressure is permitted to flow through the servo system from one conduit to the other. For instance, a suitable hydraulic line is connected to conduit 20 by means of the fastening threads 22d formed therein. In like fashion, another hydraulic line is connected to the conduit 22.

Assuming such fluid flow is from conduit 20 to conduit 22, it is seen that with the flow control portion 28b disposed intermediate the said conduits, such fluid is permitted to flow through fluid chamber 18. Such position of the flow control portion 28b may be effected by the biasing force applied to armature 28 by the pivotal supporting diaphragm 32. Upon energization of the electromagnetic winding in a given direction, magnetic flux is caused to flow in a given path through the core 44. As a result, the upper end of the magnetic portion 28a of armature 28 is attracted to the pole piece 54, the flow control portion 28b thereby restricting the flow of fluid out of the conduit 20. Such restriction, of course, is effected by the flow control portion 28b interfering with the fluid leaving the orifice 24.

Since the fluid flowing in conduit 20 is under considerable pressure, upon restriction of its flow into chamber 18, the pressure within such conduit increases appreciably. This increase in pressure is transmitted through the transverse opening 20h into the annular cavity about the conduit 20. Such increase in pressure can be used to control or actuate substantially any type of fluid pressure responsive element. One such means, namely, hydraulic unit 14, will hereinafter be described to provide an example of the use of such increased pressure.

Heretofore, electromagnetic actuators of this general description have been so constructed that the fluid has been restricted or confined to a path consisting of the conduits and the fluid chamber therebetween. That is, the pivotal support means for the armature has been utilized in prior devices as a barrier or end wall to prevent the fluid from going therebeyond into the armature chamber. In the embodiment shown in FIGURE 2, the fluid within chamber 18 is free to circulate about substantially all of the moving parts. It is permitted to flow upwardly through the openings 28d and 28c in the flow control portion and magnetic portions of the armature 28. From the opening 28c, the fluid flows through transverse opening 28h into the armature cavity or chamber 46b of housing member 42. Thus, the fluid from chamber 18 is permitted to surround the magnetic portion 28a of armature 28.

The fluid under pressure within the armature chamber 46 is also permitted to flow about the annular flange 28f to the upper surface of supporting diaphragm 32. As such, the fluid is caused to act upon the opposite surfaces of diaphragm 32 and to surround completely the armature 28.

The above-described arrangement is particularly advantageous due to the frequent and abrupt changes in pressure within chamber 18. That is, by alternatively preventing and permitting fluid flow through such chamber from one conduit to the other, the pressure of such fluid is caused to change accordingly. In fact, as indicated above, it is the correlative pressure variations in the conduits which are to effectuate the desired control function.

If such pressure variations in chamber 18 are permitted to act upon only the undersurface of diaphragm 32, such diaphragm is thus subjected to unbalanced external forces which influence and distort its biasing effect upon the armature 28. Also such external forces on diaphragm 32 alter the ability of such diaphragm to freely support the armature while permitting pivotal movement thereof. By having the same fluid pressure exposed to both of the surfaces of the diaphragm, equal and opposite forces are thereby created which effectively cancel each other. The net effect, of course, is that substantially no external forces are applied to the diaphragm 32 thereby permitting its original biasing characteristics as opposed by the magnetic force of the electromagnetic actuator to determine the position of the armature 28 and flow control portion 28b thereof.

The fluid surrounding the magnetic portion 28a effectively dampens any relatively strong and abrupt forces which may be applied thereto. For instance, in the event the subject electromagnetic actuator is employed in an environment of relatively high acceleration or deceleration, relatively large external forces are caused to act upon the armature. Heretofore, such forces have caused the armature of prior devices to be moved contrary to the energization of the electromagnetic devices associated therewith, thereby causing the entire system to operate in a manner contrary to that intended by the control signal applied thereto.

In the present invention, the fluid surrounding the magnetic portion 28a of armature 28 repels abrupt movements thereof due to the viscosity of the fluid. Thus, substantially all abrupt changes in the position of the armature are effectively minimized or dampened, thereby causing the armature to operate smoothly and continuously.

Referring to FIGURE 5 of the drawings, there is shown therein a second embodiment 100 of the present invention. Such embodiment comprises a first housing 102 which is similar in construction to the housing 16 of the embodiment of FIGURE 2. Conduits 104 and 106 are positioned within housing 102 and an electromagnetic actuator 108 is positioned thereon by means of fastening bolts 110.

As shown in FIGURE 5, the armature 112 may be formed in two parts, a magnetic portion 114 and a combination flow control portion 116 having the support member 118 formed integrally therewith. Such support member 118 comprises an annular diaphragm having an enlarged marginal edge 118a which is secured to the housing 102 by suitable fastening screws 120.

The flow control portion 116 is formed with an opening 116a wherein the lower portion 114a of magnetic portion 114 is firmly secured. In fact, the magnetic portion 114 may be press fiitted within such opening 116a to provide a unitary structure with the flow control portion 116.

As also shown in FIGURE 5, the lower end portion 114a of magnetic portion 114 is formed with a T-shaped opening 122, and is beveled as shown at 114b.

A through opening 124 is formed in the flow control portion 116 for conducting fluid from the fluid chamber between the conduits 104 and 106 to the armature chamber and upper surface of diaphragm 118.

The armature chamber is similar to the chamber 46 of the first embodiment and is provided by a housing 126 formed of nonmagnetic material. The central portion of such housing is formed as a thin-wall tube 128 having a closed upper end 128a. Such tube provides the armature chamber 130 which is filled with fluid by virtue of the opening 124, beveled end portion 114b and T-shaped opening 122 in magnetic portion 114. A core member 132 and electromagnetic means 134 cooperate to provide the magnetic flux for actuating the armature.

An enclosure or shroud 136 may be employed about the entire electromagnetic unit 108, suitable sealing means 138 being employed to provide the desired hermetic seal therefor.

Referring to FIGURE 7 of the drawings, there is shown therein a third embodiment 200 of the present invention. This embodiment comprises a first housing 202 wherein conduits 204 and 206 are firmly positioned.

An armature 208 having a magnetic portion 210 and a flow control portion 212 is provided between the conduits. The flow control portion 212 may have a diaphragm 214 formed integrally therewith.

The diaphragm 214 is provided with a relatively heavy marginal edge 214a which is firmly positioned between housing 202 and another housing member 216. The latter is formed of nonmagnetic material and comprises a tubular central portion 216a having a closed upper end 216b providing an armature chamber 218. The magnetic unit comprises a core 220 and an electromagnetic winding 222 associated therewith for causing magnetic flux flow through the armature as above explained with respect to the first embodiment.

Armature 208 is formed with a through opening 208a having a reduced upper end portion 208b. The lower end of such opening communicates with an expansible and contractible bellows 224 firmly and hermetically secured to the flow control portion 212 by suitable mounting means 226. Such bellows 224 may be positioned within a suitable opening 212a in the lower end of flow control portion 212 to prevent damage thereto upon engagement thereof with the conduits.

The space within the armature chamber 218 and above the diaphragm 214 is initially filled with fluid. Such fluid is also within the bellows 224 and the through opening 208a of armature 208. Thus, as the pressure within the chamber between the conduits 204 and 206 changes, the bellows 224 contracts or expands accordingly so as to vary the pressure of the fluid about the magnetic portion 208 of the armature and within the space above the diaphragm 214. This function is accomplished in spite of the fact that fluid within the fluid chamber is not permitted to commingle with the fluid within and about the armature 208.

Thus, contraction and expansion of bellows 224 causes the fluid about the armature and above diaphragm 214 to follow precisely the pressure variations of the fluid within the fluid chamber.

It is thus seen that the third embodiment provides an electromagnetic actuator wherein the electromagnetic means is substantially isolated from the armature controlled thereby. Thus, fluid is permitted to freely circulate about the armature and above the pivotal supporting diaphragm without in any way contaminating or interfering with the electromagnetic means. Also the dampening effect afforded by the fluid about the armature minimizes abrupt changes in the position of the armature in response to strong momentary forces applied thereto. The net effect of such arrangement is that the armature is thereby caused to more closely follow the electrical signal impressed on the electromagnetic means associated therewith.

Referring to FIGURE 9 of the drawings, there is shown therein a schematic view of a servo system for employing the subject torque motors. Such system comprises a pressure responsive element 302 having four pistons, 304, 306, 308 and 310 firmly held in spaced relation by a piston rod 312. Such pressure responsive element is permitted reciprocatable movement with a cylinder 314 therefor.

An inlet conduit 316 affords fluid pressure to the cylinder from a supply source 318. Outlet conduits 320 and 322 afford fluid flow to the opposite sides of another cylinder 324 having a slave piston 326 reciprocatably movable therewithin. A suitable piston rod 328 may be employed for effectuating additional control functions.

A reverse or accumulator 330 is connected to cylinder 314 through conduits 332 and 334. Another conduit 336, having a restrictive orifice 338, is provided from the electromagnetic actuator 340 to the accumulator 330. A conduit 342 which may constitute the passageway 16a shown in FIGURE 2, is provided from the electromagnetic unit 340 to opposite sides of the cylinder 314, through conduits 344 and 346. A restrictive orifice 348 is provided at the point where conduit 340 connects to cylinder 314 while a restrictive orifice 350 is provided in conduit 346.

Electromagnetic device 340 comprises an armature 352 which is pivoted about point 354 and is associated with electromagnetic windings 356 and 358. A permanent magnet 360 is connected to frame members 362 and 364 each of which carries a pair of pole pieces, as shown respectively at 366 and 368, and at 370 and 372.

The flow control portion 352a of armature 352 is connected to a biasing spring 374 having an adjustment screw 376 associated therewith. In similar fashion, a biasing spring 378 is associated with a pivotal member or beam 380, the latter of which is held in abutting relation with the end 312a of piston rod 312 by a torsion spring 382. The spring 378, beam 380 and spring 382 constitute a feedback link from the pressure responsive element 302 to the electromagnetic means.

When a differential current is generated by the electromagnetic windings 356 and 358, a force is applied to the armature 352, causing it to pivot about the point 354. This is the result of the armature being polarized by such differential current so as to be attracted to one or the other of the poles of the permanent magnet.

Normally, fluid is supplied under pressure from the supply 318 to the opposite ends of the pressure responsive element 302 through conduits 316, 317, 344 and 346. Such fluid pressure, after being applied to element 302 for a predetermined period of time, is caused to be equal on opposite sides of the pressure responsive element 302 to thereby maintain the latter in its neutral or intermediate position shown in FIGURE 2.

Pivotal movement of armature 352 in response to the differential current in windings 356 and 358 causes variation in the fluid pressure applied to the pressure responsive element 302 through conduit 342.

Such pressure variation is created by any one of the above-explained three embodiments of the present invention. The orifices 348 and 350 cause such pressure variation in conduit 342 to result in an appreciable difference in the application of such fluid pressure to the pistons 304 and 310. As a result, the pressure responsive element 302 is thereby moved so as to permit the fluid from source 318 to flow through either conduit 320 or conduit 322 depending upon the direction of pressure change caused by electromagnetic means 340. This, of course, causes corresponding movement of the slave piston 326 within cylinder 324.

Such movement of pressure responsive element 302 also causes extension 312a of piston rod 312, beam 380 and spring 378 to provide a feedback force for the armature 352. The relationship between such feedback force and the pressure change afforded through conduit 342 is such that the armature 352 is returned to its initial position by such feedback force. If the differential energization of windings 356 and 358 is relatively large, a greater force is required to return armature 352 to its initial or neutral position. Thus, the slave piston 326 is exposed to the fluid pressure from source 318 for a greater period of time, thereby causing it to move a greater distance. It is thus seen that the amount of differential energization of windings 356 and 358 determine the distance of movement of the slave piston 326.

Spring 374 and adjustment nut 376 associated therewith are operable to initially calibrate the device for determining the initial or neutral position of the armature 352.

The present invention thus provides improved electromagnetic torque motors wherein relatively large and abrupt forces on the armature are effectively dampened, and all of the changes in fluid pressure of the controlled fluid are effectively neutralized. Also, the present invention provides such advantages while preventing contamination of the electromagnetic actuator by such fluid.

Although I have shown and described certain specific embodiments of my invention, I am fully aware that many modifications thereof are possible. My invention, therefore, is not to be restricted except insofar as is

I claim:

1. An electromagnetic torque motor for controlling the flow of fluid through a conduit comprising in combination, means forming a flow control chamber having communication with said conduit, an electromagnetic actuator, an armature having a magnetic portion to be actuated by said actuator and a flow control portion in said flow control chamber for controlling fluid flow between said conduit and said chamber, means providing an armature chamber adjacent said electromagnetic actuator receiving said magnetic portion of said armature, pivotal support means encircling said armature between said magnetic portion and said flow control portion formed with substantially the same radial cross-section throughout its 360° encirclement, and means formed in said armature providing communication between said flow control chamber and said armature chamber to insure equal fluid pressure variations on said support means.

2. An electromagnetic torque motor for controlling the flow of fluid through a conduit according to claim 1, wherein said means for providing communication between said chambers comprises at least one passageway formed in said armature.

3. An electromagnetic torque motor for controlling the flow of fluid through a conduit according to claim 1 wherein said pivotal support means comprises a diaphragm fixed to said armature and having a marginal edge fixed to said means forming said flow control chamber, said diaphragm having substantially identical radial cross-sections throughout its 360° encirclement of said armature, said means for providing fluid flow between said chambers comprising at least one passageway formed in said armature.

4. The invention defined in claim 3, wherein said diaphragm is a solid disk attached to said armature at its center and to said means forming said flow control chamber at its marginal edge, said diaphragm being unbroken and of identical radial cross-section throughout its 360° encirclement to consistently support said armature in pivotal movement regardless of the radial direction of said movement.

5. An electromagnetic torque motor for controlling the flow of fluid through a conduit comprising in combination, a first housing formed with a fluid chamber communicating with said conduit through an orifice in the latter, an elongated armature having a flow control end portion for flow control cooperation with said orifice and an armature end portion, a support member for said armature comprising a coplanar flexible diaphragm fixed thereto intermediate said end portions and connected to said first housing to permit said armature to pivot between flow controlling positions of said flow control end portion, said diaphragm encircling said armature and having a consistent radial cross-section throughout said encirclement to provide substantially identical support and bias for said armature for radial movement thereof along any radii thereabout, an electromagnetic actuator for said armature comprising a second housing connected to said first housing and having an elongated chamber receiving said armature, said actuator further comprising electromagnetic means for controlling the pivotal position of said armature, and means insuring communication between said fluid chamber and said armature chamber comprising an opening formed in said armature to provide equal fluid pressure on opposite sides of said diaphragm to dampen high acceleration and other momentary forces on said armature.

6. An electromagnetic torque motor for controlling the flow of fluid through a conduit according to claim 5 wherein said second housing affords a hermetic enclosure for said electromagnetic means separated from the fluid controlled by said armature.

7. An electromagnetic torque motor for controlling the flow of fluid through a conduit according to claim 5 wherein said second housing is formed with a generally circular cross-section in a plane parallel with the plane of said diaphragm and said electromagnetic means in said second housing is formed with a generally circular electromagnetic core and a generally circular winding thereon in planes parallel to the plane of said diaphragm.

8. An electromagnetic torque motor for controlling the flow of fluid through a conduit according to claim 5 wherein said diaphragm is generally circular and extends laterally of said elongated armature, said diaphragm is solid and of a given cross-sectional configuration along all radii thereof throughout the 360° encirclement of said armature, the peripheral edge of said diaphragm being fixed to said first housing to prevent rectilinear movement of said armature while permitting pivotal movement thereof.

References Cited

UNITED STATES PATENTS

| | | | |
|---|---|---|---|
| 2,767,689 | 10/1956 | Moog | 137—625.62 |
| 2,824,574 | 2/1958 | Place | 137—625.62 |
| 2,924,241 | 2/1960 | Bauer | 137—625.62 X |
| 2,931,389 | 4/1960 | Moog et al. | 137—625.62 |
| 3,098,635 | 7/1963 | Delaporte et al. | 251—129 X |
| 3,209,782 | 10/1965 | Wolpin et al. | 137—625.62 |
| 3,217,728 | 11/1965 | Pegram | 137—625.64 X |
| 3,245,651 | 4/1966 | Erickson | 251—129 |

M. CARY NELSON, *Primary Examiner.*

R. C. MILLER, *Assistant Examiner.*